(12) United States Patent
Yoo et al.

(10) Patent No.: US 7,981,345 B2
(45) Date of Patent: Jul. 19, 2011

(54) FABRICATION METHOD OF PRODUCTS WITH CLOSED MICRO-CHANNELS BY INJECTION MOLDING

(75) Inventors: Yeong-Eun Yoo, Seoul (KR); Doo-Sun Choi, Daejeon (KR); Young-Ho Seo, Daejeon (KR); Tae-Hoon Kim, Daejeon (KR)

(73) Assignee: Korea Institute of Machinery and Materials, Daejeon (KR)

( * ) Notice: Subject to any disclaimer, the term of this patent is extended or adjusted under 35 U.S.C. 154(b) by 0 days.

(21) Appl. No.: 12/379,069

(22) Filed: Feb. 12, 2009

(65) Prior Publication Data
US 2010/0201028 A1  Aug. 12, 2010

(51) Int. Cl.
*B29C 45/14* (2006.01)
(52) U.S. Cl. .................. 264/259; 264/328.12
(58) Field of Classification Search .......... 264/328.1, 264/259, 328.12, 328.14; *B29C 37/00, 33/18*
See application file for complete search history.

(56) References Cited

U.S. PATENT DOCUMENTS

| | | | | |
|---|---|---|---|---|
| 4,668,460 A | * | 5/1987 | Ongena | 264/255 |
| 2004/0178537 A1 | * | 9/2004 | Polosky | 264/328.16 |
| 2009/0085235 A1 | * | 4/2009 | Burkle et al. | 264/1.24 |
| 2009/0224431 A1 | * | 9/2009 | Larsen et al. | 264/328.14 |
| 2010/0092752 A1 | * | 4/2010 | Hashimoto | 428/220 |

FOREIGN PATENT DOCUMENTS

| | | |
|---|---|---|
| JP | 2000-313030 | 11/2000 |
| KR | 10 1998 0052266 | * 9/1998 |
| KR | 1998-052266 | 9/1998 |
| KR | 10-0666785 | 1/2007 |
| WO | WO 2006/097483 | * 9/2006 |

* cited by examiner

*Primary Examiner* — Joseph S Del Sole
*Assistant Examiner* — Kimberly A Stewart
(74) *Attorney, Agent, or Firm* — Clark & Brody

(57) ABSTRACT

Disclosed is a fabrication method of products with closed channels by injection molding, which includes: a channel substrate mounting step of mounting a channel substrate comprising a plurality of opened micro-channels thereon to a mold; and a substrate cover molding step of molding a substrate cover by the injection molding on an upper surface of the channel substrate mounted to the mold, the substrate cover being coupled to the channel substrate while being molded. With this, the products with the closed channels can be fabricated without any additional coupling process between the channel substrate having the opened channels and the substrate cover, thereby simplifying a fabrication process and enhancing work efficiency.

1 Claim, 4 Drawing Sheets

FABRICATION METHOD OF PRODUCTS WITH CLOSED MICRO-CHANNELS BY INJECTION MOLDING

BACKGROUND OF THE INVENTION

1. Field of the Invention

The present invention relates to a fabrication method of products with closed channels, and more particularly, to a fabrication method of products with closed channels, in which the products can be fabricated to have the closed channels therein without any post process such as separate adhesion or welding.

2. Description of the Related Art

In general, a fabrication method of products with closed channels is that a substrate cover is coupled to an upper surface of a channel substrate having an opened micro-channel by adhesion or welding, in which the fabricated products with the closed channels allow liquid or gaseous material to flow without overflowing or leaking from the internal channels or enable optical properties to be adjusted depending on change in a refractive index of the products due to the internal channels.

Referring to FIG. 1, a conventional fabrication method of products with closed channels includes the steps of molding a channel substrate 10 with an opened micro-channel on an upper surface thereof, molding a substrate cover 20 to be coupled to the upper surface of the channel substrate 10, and coupling the channel substrate 10 and the substrate cover 20 by welding. The conventional products 30 with the closed channels are fabricated by molding the channel substrate 10 having the opened micro-channel thereon, and adhering or welding the substrate cover 20 underwent a separate molding process onto the channel substrate 10.

Thus, the foregoing conventional method of fabricating the products with the closed channel has problems that it takes much time and its efficiency is lowered since the following process of adhering or welding the substrate cover 20 to the channel substrate 10 is needed.

SUMMARY OF THE INVENTION

In order to solve the foregoing and/or other problems, it is an aspect of the present invention to provide a fabrication method of products with closed channels, which can fabricate the products with the closed channels efficiently without any additional coupling process.

Additional aspects and advantages of the present invention will be set forth in part in the description which follows and, in part, will be obvious from the description, or may be learned by practice of the invention based on means from and combination of claims.

The foregoing and/or other aspects of the present invention may be achieved by providing a fabrication method of products with closed channels by injection molding, which includes: a channel substrate mounting step of mounting a channel substrate comprising a plurality of opened micro-channels thereon to a mold; and a substrate cover molding step of molding a substrate cover by the injection molding on an upper surface of the channel substrate mounted to the mold, the substrate cover being coupled to the channel substrate while being molded.

The mold may include an upper mold and a lower mold, and a cavity into which a melting resin is injected may be provided between the upper surface of the channel substrate mounted to the lower mold and the upper mold.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Hereinafter, exemplary embodiments of the present invention will be described in more detail with reference to accompanying drawings.

Further, it will be appreciated that the terms and words used in the present specification and claims have to be interpreted not as typical or lexical meaning, but as meaning and concept corresponding to technical spirit of the present invention on the principle that an inventor is allowed to define the concept of the terms properly for the best description.

Figure 1:
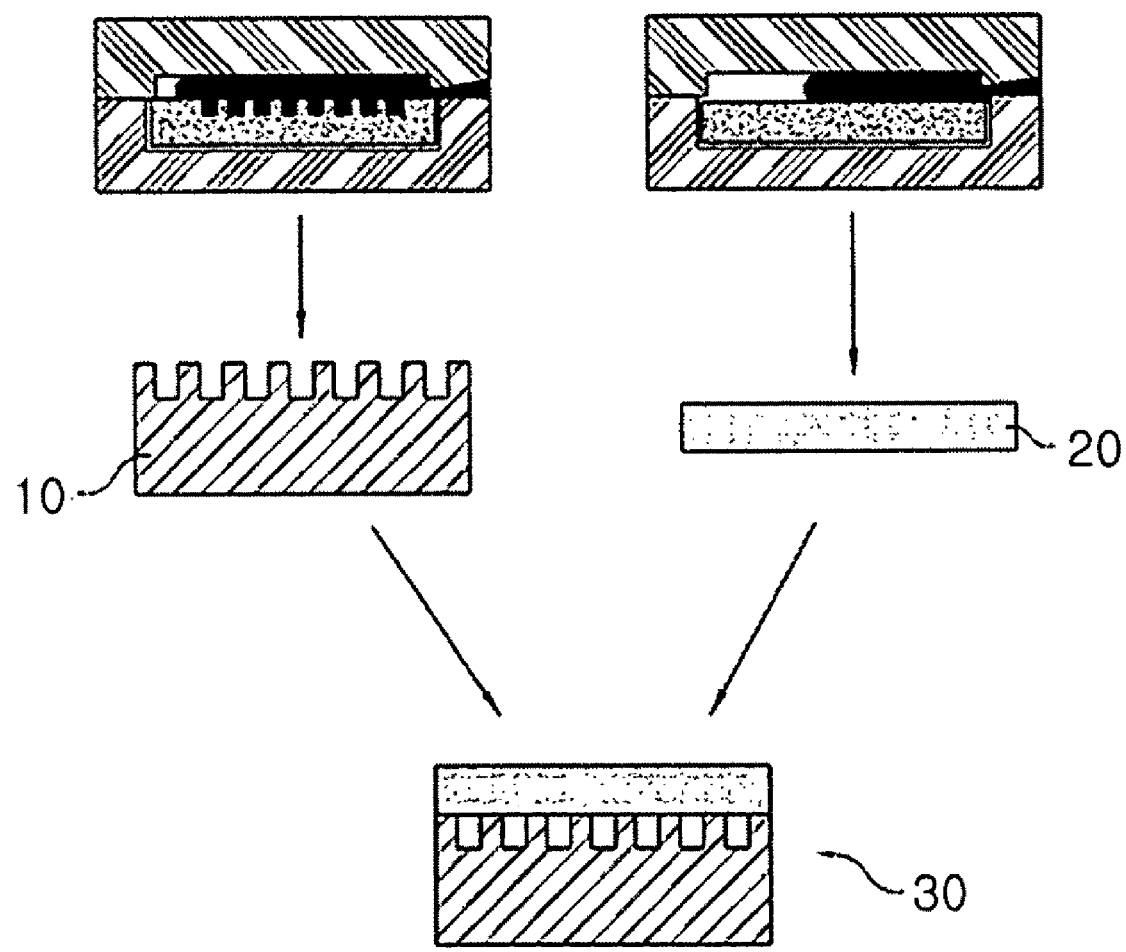
FIG. 1 is a view for showing a sequent order of a conventional fabrication method of products with closed channels.
Figure 2:
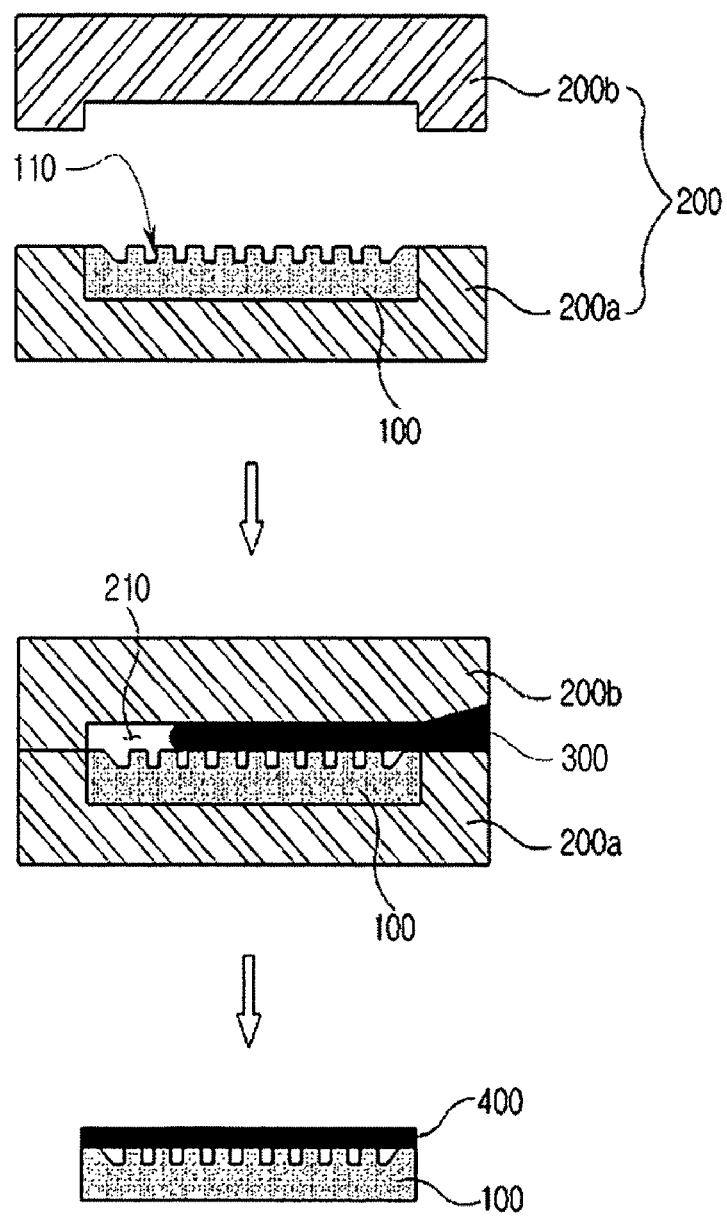
FIG. 2 is a view for showing a sequent order of a fabrication method of products with closed channels by injection molding according to an exemplary embodiment of the present invention.

FIG. 2 is a view for showing a sequent order of a fabrication method of products with closed channels by injection molding according to an exemplary embodiment of the present invention.

Referring to FIG. 2, the fabrication method of the products with the closed channels by the injection molding in this embodiment includes a channel substrate mounting step, and a substrate cover molding step.

In the channel substrate mounting step, a channel substrate 100 with a plurality of opened micro-channels 110 thereon is mounted to a lower mold 200a. The channel substrate 100 mounted to the lower mold 200a serves as a base to fabricate the products with the closed channels according to an exemplary embodiment of the present invention. In this embodiment, the micro-channels formed on the channel substrate 100 each have a width of about 500 µm or less.

Before mounting the channel substrate 100 to the lower mold 200a, the channel substrate 100 undergoes a molding process. If a stamper or mold core patterned with a plurality of channels mounted in a cavity of the mold and then melting resin is injected into the cavity, a micro-channel mirrored to the channel pattern of the stamper or the mold may be formed on the channel substrate 100. The molding process of the channel substrate 100 is obvious to those skilled in the art and detailed descriptions thereof will be thus omitted.

As the channel substrate 100 is mounted to the lower mold 200a, a cavity 210 into which a melting resin 300 is injected is formed between an upper surface of the channel substrate 100 and an upper mold 200b.

In the substrate cover molding step, a substrate cover 400 is formed by injection molding on the upper surface of the mounted channel substrate 100, and coupled to the channel substrate 100 during the injection molding.

The injection molding of the substrate cover 400 is performed by injecting the melting resin 300 into the cavity 210 formed between the channel substrate 100 and the mold 200.

At this time, the pressure, temperature and injection speed of the melting resin 300 injected into the cavity 210 of the mold 200, the temperatures of the mold 200 and the mounted channel substrate 100, or the like process conditions are adjusted so that the opened channels of the channel substrate 100 mounted to the mold 200 cannot be filled with the melting resin.

In other words, differently from a general fluid, the melting resin 300 to be injected into the cavity 210 of the mold 200 during the injection molding is melted only when heated at high temperature and thus maintains its flow. Further, the melting resin 300 has so high viscosity that very high pressure is needed to fill the cavity 210, particularly, to fill a minute region.

The lower the temperature of a thermoplastic melting resin used in the molding, the higher the viscosity thereof. In particular, the temperature drops sharply around the surface of the molding 200 and the upper surface of the channel substrate 100 where the micro-channels 110 exist. The sharp drop of the temperature and the solidification of the melting resin 300 deteriorate the molding possibility of the melting resin 300 and cause the melting resin not to permeate into the micro-channel 110. On the basis of such characteristics of a polymer melting resin whose viscosity increases due to the temperature drop to deteriorate the molding possibility, the melting resin 300 is fully suppressed not to fill the micro channel 110 under the condition of low molding temperature, decreased temperature of the surfaces of the mold 200 and the micro-channel 110, and low pressure molding, thereby fabricating the products with the closed channels.

In this embodiment, the molding temperature may be lower by about 5° C.~40° C. than the usual molding temperature of the thermoplastic resin, and the temperature of the mold 200 may be maintained at a range of 20° C.~60° C. Alternatively, the above temperatures may vary depending on the shape and the size of the products, the kind of molding resin, the structure of the mold, etc.

Figure 3:
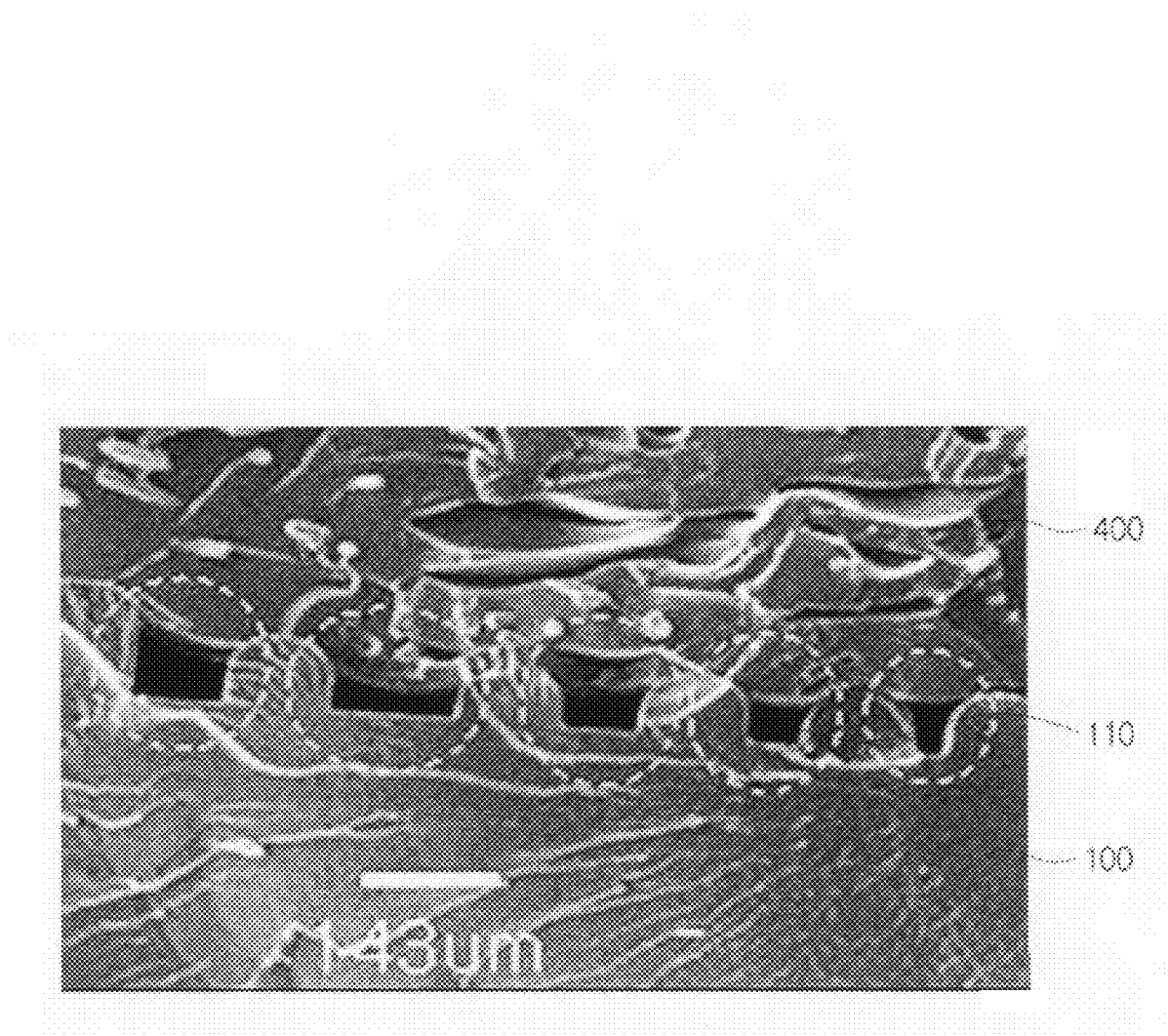
FIGS. 3 and 4 are enlarged views for showing that a substrate cover is molded and coupled to a channel substrate under in the state that no melting resin permeates into a channel.
Figure 4:
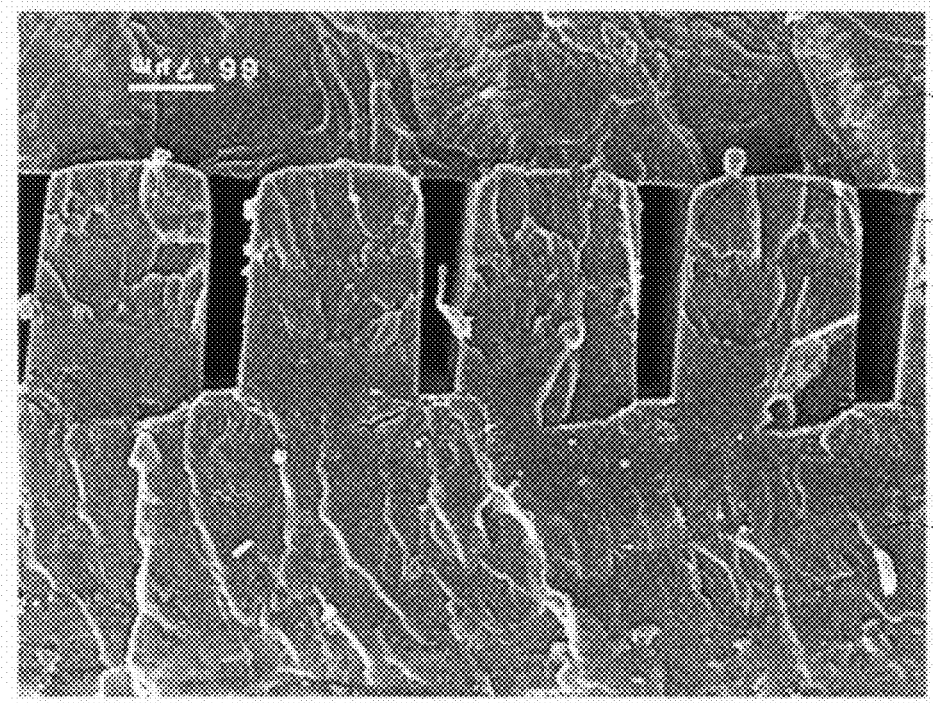

Referring to FIGS. 3 and 4, the substrate cover 400 is molded while coupling to the channel substrate 100 in the mold 200 in the state that the melting resin 300 does not permeate into the micro-channel 110, thereby completing the products with the closed channels. The products with the closed channels shown in FIGS. 3 and 4 are different in a channel width from each other.

In the fabrication method of the products with the closed channels by the injection molding according to an exemplary embodiment of the present invention, since it is not that the channel substrate and the substrate cover are individually molded and then adhered or welded to each other but that the melting resin is injected to the upper surface of the molded channel substrate to mold the substrate cover while coupling the channel substrate and the substrate cover, the products integral with the closed channels can be effectively fabricated without any additional process such as adhering or welding the respectively molded channel substrate and substrate covers.

Although a few embodiments of the present invention have been shown and described, it will be appreciated by those skilled in the art that changes may be made in these embodiments without departing from the principles and spirit of the invention, the scope of which is defined in the appended claims and their equivalents.

As described above, in the products fabricated by the fabrication method of the products with closed channels by the injection molding according to an exemplary embodiment, the products are molded integrally with the closed channels without any additional coupling process such as adhesion, welding or the like between the channel substrate and the substrate cover, so that a fabrication process can be simplified, a production cost can be also saved, and work efficiency can be improved.

The present invention is supported by "21st Century Frontier Research Programs" of Korean Ministry of Education, Science and Technology, with the project No. "08k1401-00530." The research project is named "Center for Nanoscale mechatronics and Manufacturing," and this project is titled "Injection molding of high aspect ratio nano-hybrid pattern," which will be performed from Apr. 1, 2008 to Mar. 31, 2009 by Korea Institute of Machinery and Materials.

What is claimed is:

1. A fabrication method of products with closed micro-channels by injection molding, comprising:
    a channel substrate mounting step of mounting a channel substrate comprising opened micro-channels thereon to a mold, wherein the mold comprises an upper mold and a lower mold, and a cavity into which a melting resin is injected is provided between the upper surface of the channel substrate mounted to the lower mold and the upper mold, and controlling the viscosity of the resin so that the micro-channels formed in the channel substrate are retained after the substrate cover is molded onto the substrate channel; and
    a substrate cover molding step of molding a substrate cover by injection molding on an upper surface of the channel substrate mounted to said mold, suppressing not to fill the micro-channels by controlling the viscosity of the resin, said substrate cover being coupled to said channel substrate while being molded, the molding step forming the product with closed micro-channels, the molding step forming the product comprising the channel substrate cover coupled to the channel substrate and further wherein the micro-channels are formed between the substrate cover and channel substrate.

* * * * *